UNITED STATES PATENT OFFICE.

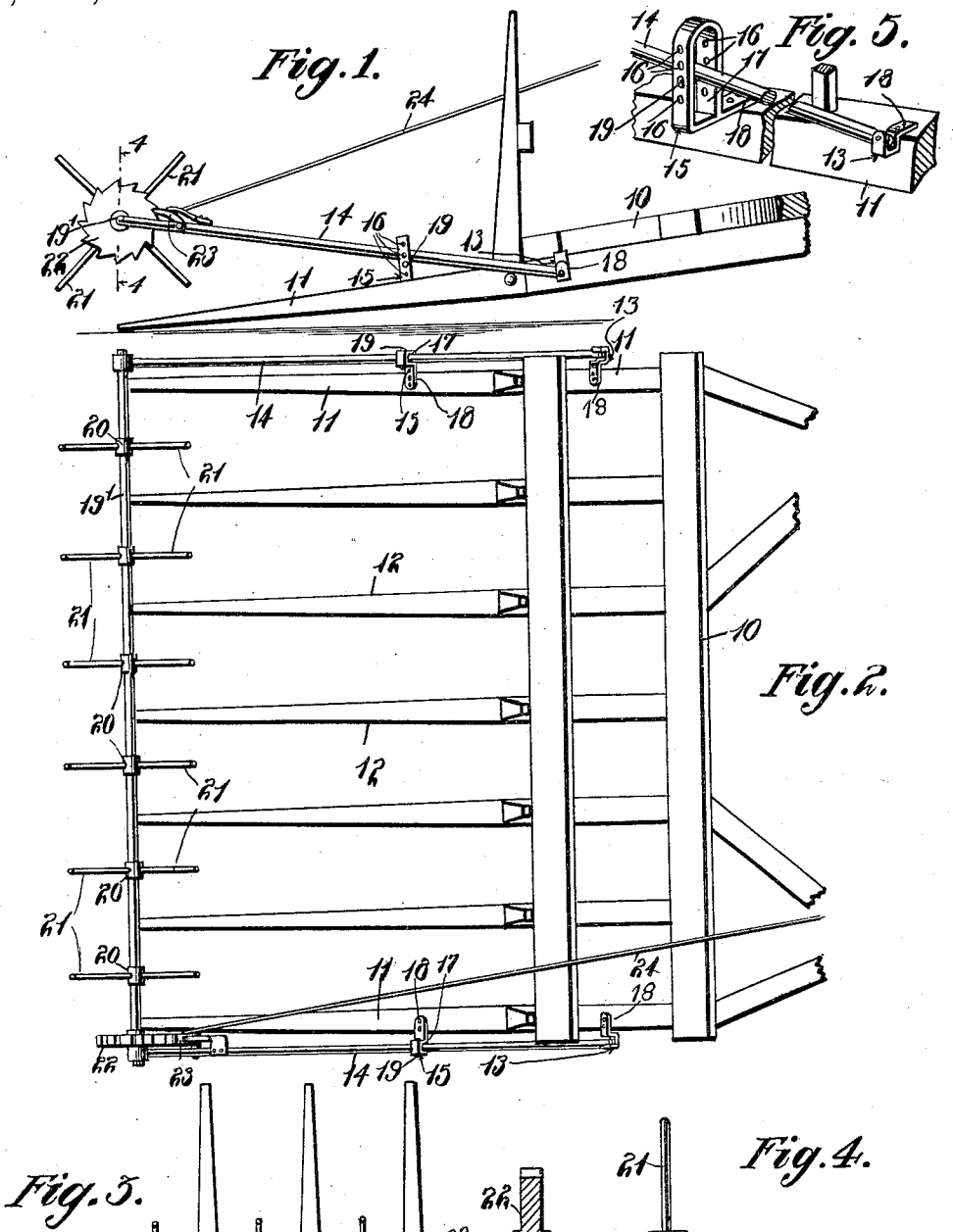

RALPH M. BAKER, OF ALLIANCE, AND JOHN DATUS, OF WESTERVILLE, NEBRASKA.

HAY-RETAINER FOR HAY-STACKERS.

1,163,123.     Specification of Letters Patent.     Patented Dec. 7, 1915.

Application filed April 22, 1914. Serial No. 833,718.

*To all whom it may concern:*

Be it known that we, RALPH M. BAKER and JOHN DATUS, citizens of the United States, residing, respectively, at Alliance and Westerville, in the counties of Box Butte and Custer, State of Nebraska, have invented certain new and useful Improvements in Hay-Retainers for Hay-Stackers; and we do hereby declare the following to be a full, clear, and exact description of the invention, such as will enable others skilled in the art to which it appertains to make and use the same.

This invention relates to hay stackers, and has particular reference to a hay retainer therefor.

The principal object of this invention is to provide a simple device of this character which will prevent the hay being withdrawn from the stacker upon withdrawal of the sweep rake.

Another object is to provide such a device of this character and simple means for releasing the retainer, so that the stacker may dump the load of hay on the stack.

Other objects and advantages will be apparent from the following description and with particular reference to the accompanying drawings.

In the drawings: Figure 1 is a side elevation of the lifting rake of a stacker. Fig. 2 is a top plan view thereof. Fig. 3 is a front elevation, partly broken away. Fig. 4 is an enlarged fragmentary section of the rotatable portion of the retainer. Fig. 5 is an enlarged detail perspective view of the support, and showing the means for holding the arm.

Referring particularly to the drawings, 10 represents the frame of a stacker, which includes the side bars 11, to which the elevating fork 12 is secured. Secured to each of the side bars 11 of the frame is a vertical bracket or support 13, in which is pivotally mounted the rear end of an arm 14. Both of the arms extend forwardly to a point directly over the free end of the fork 12. Directly in front of each of the brackets or supports 13 is a vertical member 15, provided with a vertical series of openings 16, and a vertical elongated slot 17 through which the inner end portion of the arm 14 is adapted to play. Each of the brackets 13 has an attaching foot 18. Cross pins 19 are adapted to be inserted in the openings 16 of both of the brackets 15 to limit the swinging movement of the arms 14. Extending transversely across the free end of the fork, and mounted on the outer ends of the arms 14 is a shaft 19' carrying thereon a plurality of cylindrical drums 20, to each of which is secured a plurality of radially extending arms 21, for engagement by the hay as it is placed on the fork. On one end of the shaft 19' is secured a ratchet wheel 22, which is adapted to be engaged by a spring pressed pawl 23 mounted on the adjacent arm 14, suitable connections 24 extending from the pawl to a point within convenient reach of the operator. The pawl may be raised from engagement with the ratchet teeth by means of the connections 24 to permit the shaft to rotate in one direction, for the release of the load of hay. The pawl and ratchet mechanism permits the shaft to rotate as the hay is forced in on the elevating fork, but prevents it rotating in the opposite direction, until released by the operator. This prevents the hay being withdrawn from the fork while the rake is depositing a load thereon. As the sweep rake advances to the stacker, the hay will engage the radial arms 21 from beneath the shaft 19', and rotate the shaft. When the rake is withdrawn from the stacker, and then backed off, the pawl prevents retrograde movement of the shaft and arms and thus holds the hay and permits the sweep rake to be withdrawn, the cable 24 being pulled to release the pawl 23 so that the hay will slide from the rake under the arms 21 and rotate the shaft in the opposite direction, when the stacker is lifted to deposit the hay on the stack.

What is claimed is:

1. The combination with a hay stacker including an elevating fork, of a hay retainer comprising supports mounted at the inner end of the fork, arms pivoted on the supports and extending to the outer end of the fork, a rotating shaft on the arms, hay retaining arms on the shaft, and means for holding the shaft against rotation in one direction.

2. The combination with a hay stacker including an elevating fork, and a frame to which said fork is attached, of a hay retainer comprising supports mounted on the frame at the inner end of the fork and on opposite sides thereof, arms pivoted to the supports and extending over the outer end of the fork, a rotatable shaft journaled in the outer ends of the arms, means for preventing the retrograde movement of the shaft, radially extending hay engaging arms on the shaft, and adjustable means on the supports for engagement with the shaft supporting arms for limiting the pivotal movement of the shaft supporting arms.

In testimony whereof, we affix our signatures, in the presence of two witnesses.

RALPH M. BAKER.
JOHN DATUS.

Witnesses:
 GEO. E. RICHTMYER,
 GROVER A. HOLEMAN.

Copies of this patent may be obtained for five cents each, by addressing the "Commissioner of Patents, Washington, D. C."